(12) United States Patent
Kamimura et al.

(10) Patent No.: US 7,548,398 B2
(45) Date of Patent: Jun. 16, 2009

(54) THERMALLY ASSISTED MAGNETIC RECORDING MEDIUM

(75) Inventors: Takuya Kamimura, Kawasaki (JP); Koji Matsumoto, Kawasaki (JP); Yuzuru Yamakage, Kawasaki (JP); Koichi Iida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 362 days.

(21) Appl. No.: 11/355,878

(22) Filed: Feb. 15, 2006

(65) Prior Publication Data

US 2006/0210838 A1   Sep. 21, 2006

(30) Foreign Application Priority Data

Mar. 15, 2005   (JP)   ............................. 2005-072645

(51) Int. Cl.
  *G11B 5/62* (2006.01)
  *G11B 5/82* (2006.01)
(52) U.S. Cl. .................. 360/135; 369/13.54; 369/13.55
(58) Field of Classification Search ................. 360/135; 369/13.54, 13.55
  See application file for complete search history.

(56) References Cited

U.S. PATENT DOCUMENTS

| | | | | |
|---|---|---|---|---|
| 6,424,602 B1 * | 7/2002 | Fujii | ....................... | 369/13.09 |
| 6,614,731 B2 * | 9/2003 | Ishii | ....................... | 369/13.54 |
| 6,868,048 B1 * | 3/2005 | McDaniel et al. | ......... | 369/13.06 |
| 2004/0042381 A1 * | 3/2004 | Miyamoto et al. | ........ | 369/275.4 |
| 2005/0073943 A1 * | 4/2005 | Oshima et al. | ............... | 369/286 |
| 2005/0094549 A1 * | 5/2005 | Hieda et al. | ................. | 369/277 |
| 2005/0202287 A1 * | 9/2005 | Lu et al. | ................... | 428/831.2 |
| 2007/0009766 A1 * | 1/2007 | Lu et al. | ................... | 428/836.1 |
| 2007/0190460 A1 * | 8/2007 | Inoue et al. | ............ | 430/270.13 |
| 2008/0131548 A1 * | 6/2008 | Gauzner et al. | ............. | 425/175 |

FOREIGN PATENT DOCUMENTS

| | | |
|---|---|---|
| JP | 6-243527 | 9/1994 |
| JP | 2003-157502 | 5/2003 |

* cited by examiner

*Primary Examiner*—Jefferson Evans
(74) *Attorney, Agent, or Firm*—Fujitsu Patent Center

(57) ABSTRACT

A thermally assisted magnetic recording medium includes a substrate having a first surface and a second surface opposite to the first surface. A recording layer is formed on the first surface of the substrate. A plurality of thermally conductive regions are provided at the first surface of the substrate to extend in parallel to each other and about the center of rotation of the recording medium. The thermally conductive regions have a higher thermal conductivity than the substrate, and are at least partially embedded in the substrate.

15 Claims, 6 Drawing Sheets

THERMALLY ASSISTED MAGNETIC RECORDING MEDIUM

BACKGROUND OF THE INVENTION

1. Field of the Invention:

The present invention relates to magnetic recording mediums which make use of thermal assistance for recording information.

2. Description of the Related Art:

Magnetic recording mediums, such as magnetic discs, are known as recording means used for storage devices such as hard discs. Magnetic discs have a laminate structure which includes a disc substrate and a recording layer having a predetermined magnetic structure. With increasing amount of information processing in computer systems, there is a demand for magnetic discs capable of recording at a higher density.

When recording information in a magnetic disc, a recording magnetic head is placed closely to a recording surface (provided by the recording layer) of the magnetic disc. The magnetic head applies to the recording layer a recording magnetic field which is stronger than the coercive force of the recording layer. While the magnetic head is moved relatively to the magnetic disc, the direction of the recording magnetic field applied by the magnetic head is inverted successively, whereby there is formed in the recording layer a plurality of recording marks (magnetic domains) whose direction of magnetization is inverted successively in a circumferential direction i.e. in a track running direction. By controlling the timing of inverting the direction of recording magnetic field in this process, a recording mark is formed at each place in a predetermined length. Thus, a predetermined signal or information is recorded in the recording layer, in the form of change in the magnetic direction.

In the technical field of magnetic discs, it is known that if the recording layer has a higher coercive force, then the magnetic domain formed in the recording layer will have a higher thermal stability, and it is easy to form a finer or narrower, stable magnetic domain. The finer is the smallest magnetic domain stably formable in the recording layer, the greater recording density achievable in the magnetic disc.

As described, when recording information in a magnetic disc, application of a recording magnetic field which is stronger than the coercive force of the recording layer is necessary in order to form recording marks appropriately. This leads to an idea that with increasingly stronger coercive force selected for the recording layer, the magnetic head should apply a stronger recording magnetic field. However, intensity of the recording magnetic field applicable by the magnetic head is restricted by such aspects as the structure and power consumption of the magnetic head.

Given this restriction, so called thermally assisted magnetic recording method is sometimes utilized in information recording in magnetic discs. When recording information in a magnetic disc by means of a thermally assisted magnetic recording method, a laser beam for example, from an optical head placed near the recording surface of the rotating magnetic disc locally heats the recording layer of the magnetic disc successively. The region in the recording layer whose temperature has been raised due to the heating now has a lower coercive force than the surrounding region in which temperature was not raised. Then, a magnetic head placed near the recording surface of the magnetic disc applies to the temperature-raised region a recording magnetic field which is stronger than the coercive force of the temperature-raised region of the recording layer, thereby magnetizing part the temperature-raised region in a predetermined magnetic direction. The magnetization is fixed as the magnetized area cools down. In the thermally assisted magnetic recording method, these steps form a plurality of recording marks (magnetic domains) each having a successive inversion pattern of the magnetic direction and a predetermined length in accordance with the recording signal, along a track which runs in a circumferential direction of the disc. In magnetic discs which utilize the thermally assisted magnetic recording method, there is no need for very much increasing the intensity of the recording magnetic field applied by the magnetic head even if the recording layer is given a strong coercive force for information holding or information playback, since recording of information is made by first heating the recording layer thereby lowering the coercive force of the area, and then recording the information by applying a recording magnetic field to the area. Thermally assisted magnetic discs such as the above are disclosed in the following Paten Document 1 and Paten Document 2 for example.

Paten Document 1: JP-A-6-243527

Paten Document 2: JP-A-2003-157502

When recording information in a thermally assisted magnetic disc, an intended recording region in the recording layer is heated. As the temperature of the intended recording region increases, the temperature of the surrounding area also increases significantly. On the other hand, in the thermally assisted magnetic disc technology, the recording layer should have a high coercive force in view of high recording density whereas the recording layer must be heated more intensely at a time of information recording if the recording layer has a higher coercive force. However, in conventional thermally assisted magnetic discs, intense heating at the time of information recording can cause too much region of the recording layer to be heated above the predetermined temperature. This causes problems: For example, the recording track along which the recording marks are being formed successively becomes undesirably widened into the adjacent tracks. This and other problems can cause a cross-writing phenomenon, i.e. erasure or deterioration of the recording marks on the adjacent tracks. The cross-writing phenomenon is an obstruct to the goal of narrowing the track pitch, and is undesirable from the view point of high recording density. As described, there are difficulties in conventional thermally assisted magnetic discs (thermally assisted magnetic recording mediums) if their recording density is to be increased.

SUMMARY OF THE INVENTION

The present invention was made under the above-described circumferences and it is therefore an object of the present invention to provide a thermally assisted magnetic recording medium suitable for reducing thermal spread in the recording layer in transversal directions of the track when recording information.

A thermally assisted magnetic recording medium provided by the present invention has a laminate structure including a substrate and a recording layer. The substrate has a first surface and a second surface opposite to the first surface. The recording layer is formed on the first surface of the substrate. The recording medium is rotated for recording information. The recording medium is provided with a plurality of thermally conductive regions extending in parallel to each other and around the center of the rotating movement. The thermally conductive regions have a higher thermal conductivity than the substrate. Each of the thermally conductive regions is at least partially embedded in the substrate. The thermally conductive regions may penetrate through the recording layer.

According to a thermally assisted magnetic recording medium having the structure described above, it is possible to appropriately reduce heat propagation in transversal directions of the track within the recording layer, if a single track is provided in each in-between region which runs in an in-plane direction of the substrate or the recording layer and is sandwiched between two thermally conductive linear regions for recording marks to be formed by means of thermally assisted magnetic recording method.

In the magnetic recording medium of the present invention, one track may be provided in each in-between area of the recording layer sandwiched between two immediately adjacent thermally conductive regions for recording information by a thermally assisted magnetic recording technique. In such a case, a laser beam, for example, is applied onto a predetermined target track to locally heat the recording layer. Meanwhile, a recording magnetic field is applied to the recording layer along the target track. In this way, it is possible to form a plurality of recording marks (magnetic domains) each having a successive inversion pattern of the magnetic direction and a predetermined length in accordance with the recording signal, along the target track. In the present magnetic recording medium, when information is being recorded in the recording layer along a track (a first track) which is successively heated, an adjacent track (a second track) is separated by a region which makes contact with a thermally conductive linear region that has a higher thermal conductivity than the substrate. Therefore, the heat which was supplied to the recording layer by the laser for localized temperature rise in the first track is likely to diffuse into the thermally conductive linear region, and further, from the thermally conductive linear region to the substrate in the process of propagation from the first track toward the second track through the recording layer 1. Therefore, according to the present magnetic recording medium, it becomes possible to appropriately reduce heat propagation in transversal directions of the track within the recording layer, as long as a single track is provided in each in-between region which runs in an in-plane direction of the substrate or the recording layer and is sandwiched between two thermally conductive linear regions for recording marks to be formed by means of thermally assisted magnetic recording method. A magnetic recording medium such as the above is suitable for eliminating or reducing cross-writing phenomenon toward the goal of narrowing the track pitch or increasing recording density.

Preferably, the thermal conductive regions may have a higher thermal conductivity as they are closer to the center of the rotation of the recording medium. An arrangement such as this is suitable for giving a higher heat diverting capability (the ability to reduce thermal propagation to the adjacent track) to a thermally conductive linear region which is closer to the center of rotation. There is a case where a radially more inward recording track or region of the recording layer receives a greater amount of thermal energy per unit time. In such a case, it is preferable that a radially more inward thermally conductive linear region is given a higher heat-diverting capability.

Preferably, the thermal conductive regions may have a greater cross-sectional area as they are closer to the center of the rotation of the recording medium. To achieve such an arrangement, the thermal conductive regions may be longer in the substrate thickness direction as they are closer to the center of the rotation of the recording medium, or the thermal conductive regions may be wider as they are closer to the center of the rotation of the recording medium. In the latter case, the thermal conductive regions may be the same in size as viewed in the substrate thickness direction (in other words, the regions may have the same length in the substrate thickness direction). These arrangements are advantageous in providing an inner thermal conductive region with a higher thermal conductivity.

Preferably, the thermally conductive regions may be divided into a plurality of groups each consisting of adjacent thermally conductive regions. In this case, a thermally conductive region belonging to a group closer to the center of the rotation may be given a higher thermal conductivity. An arrangement such as this is suitable for giving a higher heat diverting capability to thermally conductive regions which belong to a group closer to the center of the rotation.

Preferably, the thermally conductive regions may be divided into a plurality of groups each consisting of adjacent thermally conductive regions, and a thermally conductive region belonging to a group closer to the center of the rotation may have a greater cross-sectional area. To this end, a thermally conductive region belonging to a group closer to the center of rotation may be longer in a substrate thickness direction. As another example, a thermally conductive region belonging to a group closer to the center of the rotation may be wider. An arrangement such as this is suitable for giving a higher heat diverting capability to thermally conductive regions which belong to a group closer to the center of rotation.

DETAILED DESCRIPTION OF THE PREFERRED EMBODIMENTS

Figure 1:
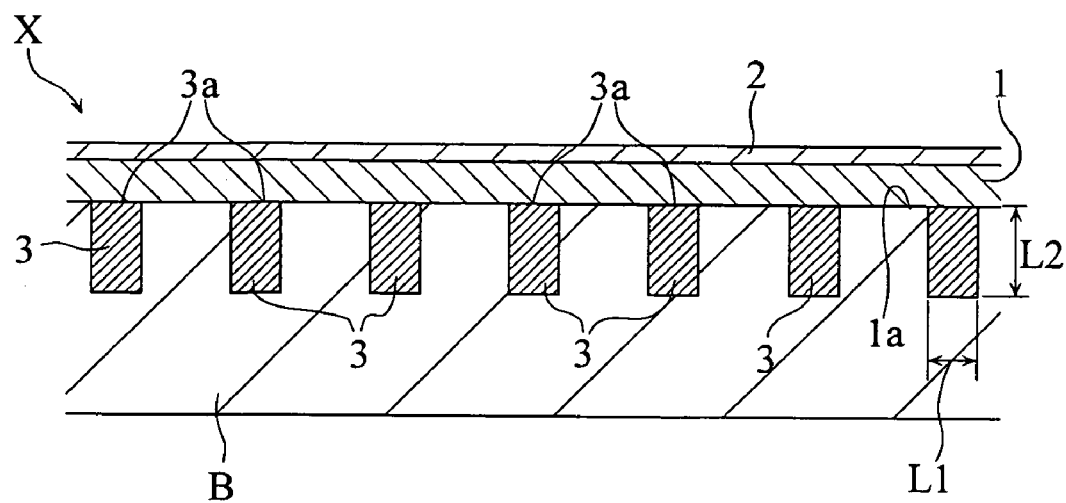
FIG. 1 is a partial sectional view of a magnetic disc according to the present invention, taken in a radius of the disc.

FIG. 1 is a partial sectional view of a magnetic disc X taken in a radius thereof, according to a first embodiment of the present invention. The magnetic disc X, which includes a disc substrate B, a recording layer 1, protective layer 2, a plurality of thermally conductive linear regions 3, is a magnetic recording medium capable of recording and playing back information by means of a thermally assisted magnetic recording method.

The disc substrate B is primarily a part which gives rigidity to the magnetic disc X, and is made of e.g. an aluminum alloy, a glass or a resin. The recording layer 1 is provided by e.g. a perpendicular magnetic film or an in-plane magnetic film, constituting a recording surface where information is recorded in the magnetic disc X. The recording layer 1 such as the above is made of e.g. a Co alloy, a Fe alloy or a rare-earth transition-metal amorphous alloy. The protective layer 2 is a part which provides the recording layer 1 with mechanical and chemical protection against damages potentially caused from outside, and is made of e.g. SiN, $SiO_2$, or diamond-like carbon. The laminate structure of the magnetic disc X which includes the disc substrate B, the recording layer 1 and the protective layer 2 may also include other layers as needed.

Figure 2:
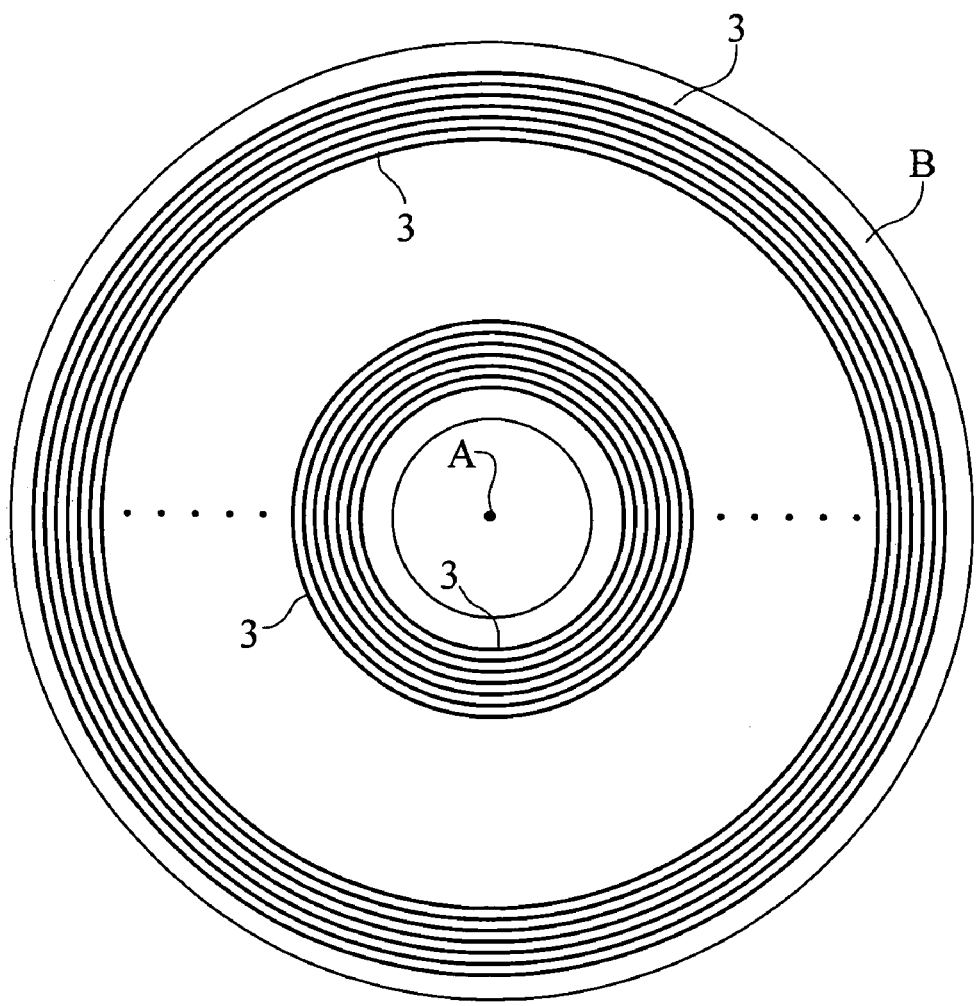
FIG. 2 is a plan view showing a disc substrate and thermally conductive linear regions of the magnetic disc in FIG. 1.

The thermally conductive linear regions 3 have a higher thermal conductivity than the disc substrate B, and is formed within the thickness of disc substrate B. In each thermally conductive linear region 3, an end surface 3a on the side of recording layer 1 is flush with a surface 1a of the disc substrate B which is the side formed with the recording layer 1. As shown in FIG. 2 conceptually with some parts unillustrated, the thermally conductive linear regions 3 are made in a centric pattern, with the center of rotation A of the magnetic disc X being their common center. In other words, the thermally conductive linear regions 3 run in parallel to each other in a circumferential direction of the magnetic disc X. The thermally conductive linear regions 3 are formed at a radial pitch of the magnetic disc X, e.g. at 100 through 200 nm in accordance with a pitch at which the recording tracks are formed in the recording layer 1. The thermally conductive linear regions 3 have a length L1 as indicated in FIG. 1 (a dimension in the radial direction of the magnetic disc X) which is 5 through 80 nm for example. The thermally conductive linear regions 3 have a length L2 as indicated in FIG. 1 (a dimension in the thickness direction of the magnetic disc X) which is 20 through 100 nm for example. In the present embodiment, all of the thermally conductive linear regions 3 have the same length L1, and all of the thermally conductive linear regions 3 have the same length L2. Therefore, in the present embodiment, all of the thermally conductive linear regions 3 have the same area of cross section (the area of section taken in a radius of the magnetic disc X).

The thermally conductive linear regions 3 as the above are made of a material which has a high thermal conductivity. Examples are Ag, Ag alloys (such as AgSi), Al, Al alloys, Au and Cu. In the present embodiment, all of the thermally conductive linear regions 3 may have the same thermal conductivity. Another option is to give a higher thermal conductivity to a radially more inward thermally conductive linear regions 3 which is closer to the center of rotation A. (For example, if the thermally conductive linear regions 3 are made of AgSi in which Ag has a relatively high thermal conductivity, the ratio of Ag to Si may be increased for a thermally conductive linear region 3 which lays radially more inward of the disc. In this way, it is possible to give a higher thermal conductivity to a radially more inward thermally conductive linear region 3.) Still another option is that all of the thermally conductive linear regions 3 are divided into a plurality of groups each consisting of a plurality of mutually adjacent thermally conductive linear regions 3, and the thermally conductive linear region 3 belonging to a group which is closer to the center of rotation A than another are given a higher thermal conductivity.

Figure 3:
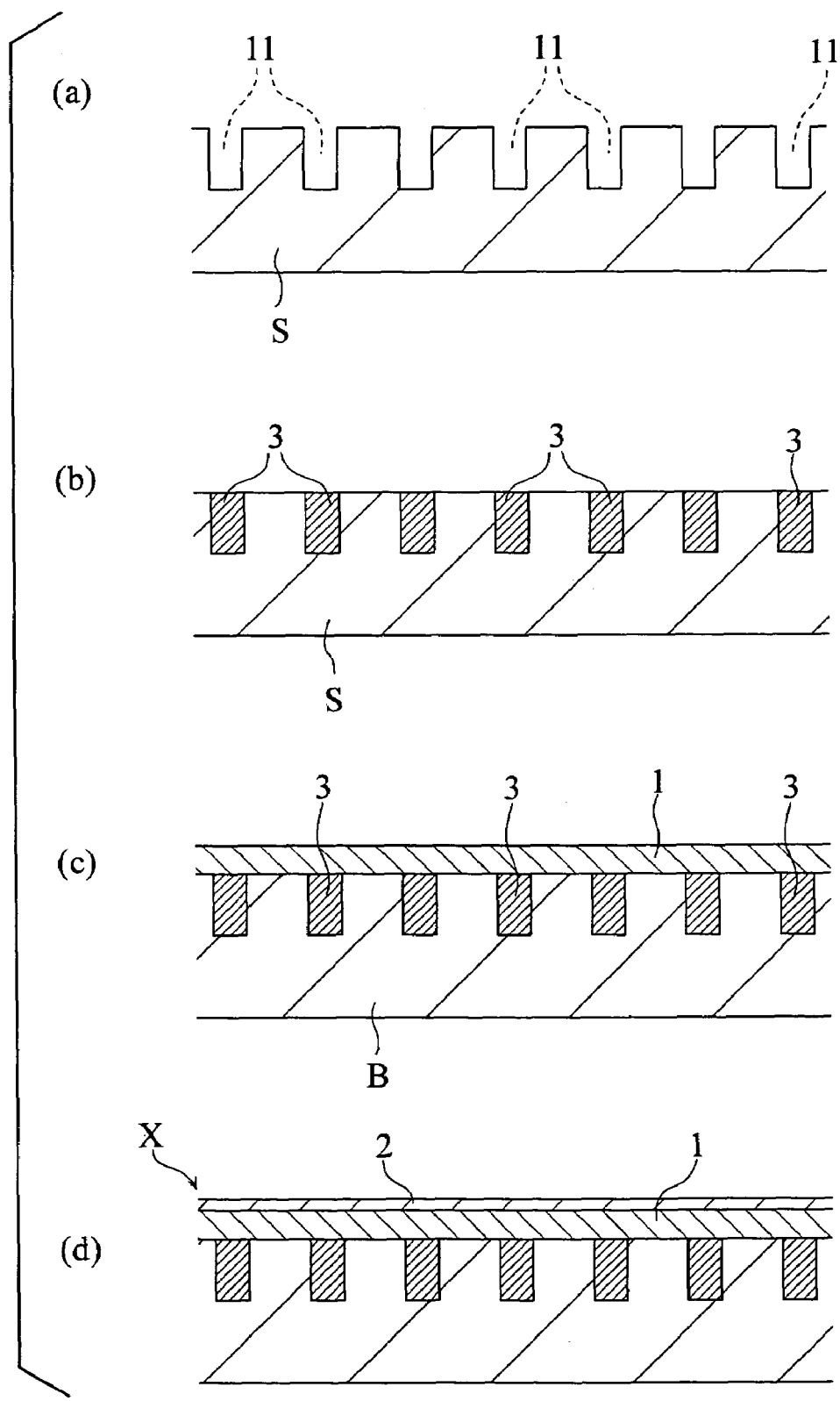
FIG. 3 shows a method of making the magnetic disc in FIG. 1.

FIG. 3 shows a method of manufacture of the magnetic disc X. FIG. 3 shows a process of manufacturing a magnetic disc X in a series of radial sectional views.

When manufacturing the magnetic disc X, first, as shown in FIG. 3(a), a plurality of grooves 11 are formed in a disc substrate B. Specifically, a mask (not illustrated) which has a predetermined pattern of openings is formed on the disc substrate B. Through this mask, an etching process is performed to the disc substrate B from above as in the figure, whereby the grooves 11 are formed. Each of the grooves 11 provides a space for disposing a thermally conductive linear region 3.

Next, as shown in FIG. 3(b), a plurality of thermally conductive linear regions 3 are formed. From above the mask, which has openings each corresponding to one of the grooves 11, a sputtering process is performed whereby a predetermined thermally highly conductive material is deposited in each of the grooves 11 to form thermally conductive linear regions 3. The mask is removed after the process of depositing the material is completed. If all the thermally conductive linear regions 3 are to be given the same thermal conductivity, the sputtering process is performed by utilizing a single target for example, to allow the thermally highly conductive material to deposit in each of the grooves 11. If a higher thermal conductivity is to be given to a radially more inward thermally conductive linear region 3, the sputtering process is performed by utilizing a plurality of targets (co-sputtering) for example, to allow each material to deposit in each of the grooves 11 at a different rate and to allow thermally highly conductive materials to deposit at a different ratio in each of the grooves 11. If all of the thermally conductive linear regions 3 are divided into a plurality of groups each consisting of a plurality of mutually adjacent thermally conductive linear regions 3, and the thermally conductive linear region 3 belonging to a group which is closer to the center of rotation A than another are given a higher thermal conductivity, the sputtering process is performed by utilizing a single target for each group of grooves 11 for example, to allow the thermally highly conductive material to deposit in the grooves 11, so that each group has a deposit of a thermally highly conductive material of a different ratio from the others.

Next, as shown in FIG. 3(c), a recording layer 1 is formed on the disc substrate B. The recording layer 1 can be formed by means of sputtering method for example, through formation of a film of a predetermined magnetic material on the surface of the disc substrate B embedded with the thermally conductive linear regions 3. Next, a film of a predetermined material is formed on the recording layer 1 by sputtering method for example, thereby forming a protective layer 2 as shown in FIG. 3(d). Thus, the magnetic disc X can be manufactured through the steps described above.

Figure 4:
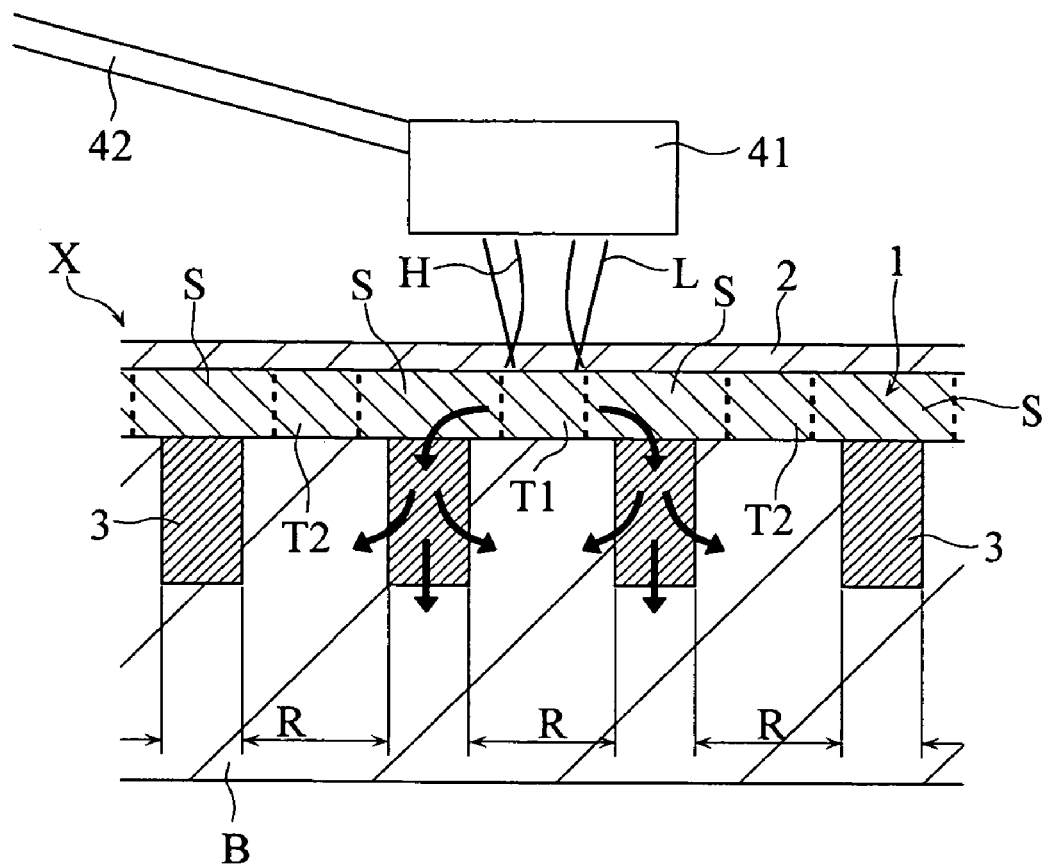
FIG. 4 shows how information is recorded in the magnetic disc in FIG. 1.

FIG. 4 shows how information is recorded in the magnetic disc X by using a thermally assisted magnetic recording method. Note that in FIG. 4 the magnetic disc X is illustrated in a partial sectional view. When recording information in a magnetic disc X, the magnetic disc X is rotated at a predetermined speed, and a slider 41 is placed to face the magnetic disc X, to oppose the side formed with the protective layer 2.

The slider 41 is provided with a condenser lens (not illustrated), a recording magnetic head (not illustrated) and a playback magnetic head (not illustrated). The condenser lens condenses a laser beam L emitted from an unillustrated light source, onto the recording layer 1. The recording magnetic head, which applies a predetermined recording magnetic field H to the recording layer 1, includes a coil for a magnetic field generating current to flow, and magnetic poles for enhancing the generated magnetic field into a strong magnetic field. The playback magnetic head, which detects magnetic signals represented by the state of magnetization of the recording layer 1 for conversion into electric signals, is provided by a GMR device or an MR device for example. The slider 41 as the above is connected with an unillustrated actuator via a leaf-spring-like suspension arm 42. The actuator, which controls the radial position of the slider 41 with respect to the magnetic disc X, is provided by a voice coil motor for example.

In the magnetic disc X, a track is provided by an in-between region R, which is a region of the recording layer 1 that extends in in-plane directions of the disc and is sandwiched between two mutually adjacent thermally conductive linear regions. Therefore, when recording information in a magnetic disc X, the actuator controls the slider 41 so that the slider 41 faces a target track which is an in-between region R lying between two thermally conductive linear regions. In this way, under the position control, the slider 41 is faced to the magnetic disc X, and the laser beam L is applied onto the target track to locally heat the recording layer 1 successively. Meanwhile, a predetermined recording magnetic field H is applied to the recording layer 1 along the target track successively. The above-described steps form a plurality of recording marks (magnetic domains) each having a successive inversion pattern of the magnetic direction and a predetermined length in accordance with the recording signal, along the target track.

In the magnetic disc X, when information is being recorded in the recording layer 1 along a track T1 which is successively heated, the adjacent tracks T2 are separated from the track T1 by a region which makes contact with a thermally conductive linear region 3 that has a higher thermal conductivity than the disc substrate B. Therefore, the heat which was supplied to the recording layer 1 by the laser for localized temperature rise in the track T1 is likely to diffuse as indicated by bold arrows in FIG. 4 into the thermally conductive linear regions 3, and further, from the thermally conductive linear regions 3 to the disc substrate B in the process of propagation from the track T1 toward the tracks T2 through the recording layer 1. Therefore, according to the magnetic disc X, it becomes possible to appropriately reduce heat propagation in transversal directions of the track within the recording layer 1, as long as a single track is provided in each in-between region R which runs in an in-plane direction of the recording layer 1 and is sandwiched between two thermally conductive linear regions for recording marks to be formed by means of thermally assisted magnetic recording method. The magnetic disc X as the above is suitable for eliminating or reducing crosswriting phenomenon toward the goal of narrowing the track pitch or increasing recording density.

In the magnetic disc X, if a higher thermal conductivity is given to a thermally conductive linear region 3 which lays radially more inward as mentioned earlier, a thermally conductive linear region 3 which lays radially more inward exhibit a higher heat-diverting capacity at the time of information recording. This is advantageous in recording information in the magnetic disc X when a radially more inward recording track or region of the recording layer 1 will receive a greater amount of thermal energy per unit time. (An example will be a case where disc rotating speed is constant and laser emission power is constant regardless of where information is recorded on the disc radius in the recording surface.) In such a case, it is desirable that a radially more inward thermally conductive linear region 3 has a higher heat-diverting capability. By making a radially more inward thermally conductive linear region 3 have a higher heat-diverting capability, it becomes possible to uniformalize heat distribution near a target track at the time of information recording regardless of where the target track is on the disc radius.

On the other hand, in the case where all of the thermally conductive linear regions 3 are divided into a plurality of groups each consisting of a plurality of mutually adjacent thermally conductive linear regions 3, and the thermally conductive linear region 3 belonging to a group which is closer to the center of rotation A than another are given a higher thermal conductivity, a group of thermally conductive linear regions 3 which lay radially more inward than other groups exhibit a higher heat-diverting capacity at the time of information recording. Therefore, the arrangement that a group of thermally conductive linear regions 3 which lays radially more inward have a higher heat-diverting capability is suitable for uniformalizing heat distribution near a target track at the time of information recording regardless of where the target track is on the disc radius.

A note should be made here about the width of a space S between the tracks (indicated in FIG. 4) in a recording layer 1. A wider width is preferable from a view point that the thermal energy supplied to the track T1 during information recording process for example must be prevented from reaching, or be reduced before reaching the adjacent tracks T2 for example. On the contrary, the width should not be too wide from a view point that an adequate dimension must be secured for the width of recording track so that the recording marks recorded along the tracks T1, T2 will have an appropriate width. If the width of recording mark or track is too narrow, there can be a case where sufficient signal strength is not obtained at the time of information playback. From these view points, a value of track-width/space-width is preferably 1.5 through 15.

Figure 5:
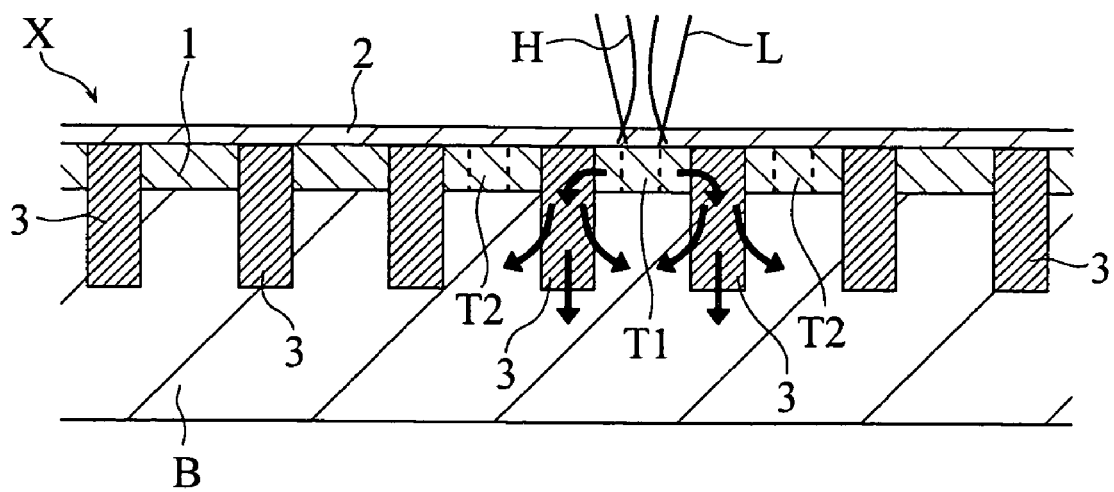
FIG. 5 is a partial sectional view of a first variation of the magnetic disc in FIG. 1, taken in a radius of the disc.

FIG. 5 is a partial sectional view of a first variation of the magnetic disc X, taken in a radius of the disc. In the present variation, thermally conductive linear regions 3 penetrate the recording layer 1. When recording information in the present variation, while information is being recorded in the recording layer 1 along a track T1 which is successively heated, the adjacent tracks T2 are separated from the track T1 by a region which is penetrated by a thermally conductive linear region 3 that has a higher thermal conductivity than the disc substrate B. Therefore, the heat which was supplied to the recording layer 1 by the laser for localized temperature rise in the track T1 enters the thermally conductive linear regions 3 in the process of propagation from the track T1 toward the track T2. Thus, the propagated heat is likely to diffuse downwardly, as indicated by bold arrows, into the thermally conductive linear regions 3, and further, from the thermally conductive linear regions 3 to the disc substrate B.

Figure 6:
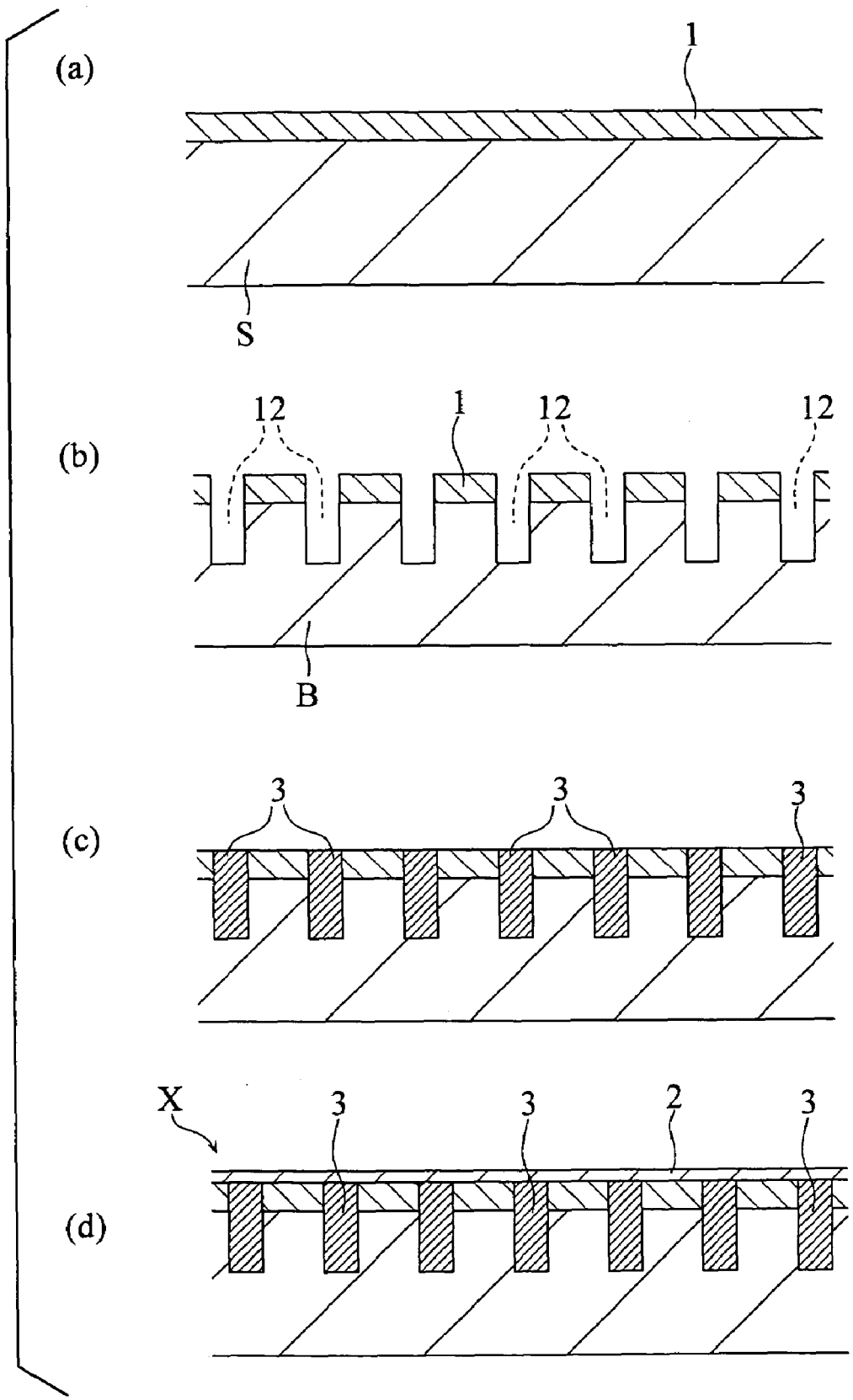
FIG. 6 shows a method of making the first variation.

FIG. 6 shows a method of manufacture of the first variation of the magnetic disc X. FIG. 6 shows a process of manufacturing the first variation in a series of radial sectional views.

When manufacturing the first variation, first, as shown in FIG. 6(a), a recording layer 1 is formed on a disc substrate B by sputtering for example. Next, as shown in FIG. 6(b), a plurality of grooves 12 are formed. Each of the grooves 12 provides a space for disposing a thermally conductive linear region 3. Specifically, a mask (not illustrated) which has a predetermined pattern of openings is formed on the recording layer 1. Through this mask, an etching process is performed to the recording layer 1 and the disc substrate B from above as in the figure, whereby the grooves 12 are formed.

Next, as shown in FIG. 6(c), a plurality of thermally conductive linear regions 3 are formed. From above the mask, which has openings each corresponding to one of the grooves 12, a sputtering process is performed whereby a predetermined thermally highly conductive material is deposited in each of the grooves 12 to form thermally conductive linear regions 3. The mask is removed after the process of depositing the material is completed. If all the thermally conductive linear regions 3 are to be given the same thermal conductivity, the sputtering process is performed by utilizing a single target for example, to allow the thermally highly conductive material to deposit in each of the grooves 12. If a higher thermal conductivity is to be given to a radially more inward thermally conductive linear region 3, the sputtering process is performed by utilizing a plurality of targets (co-sputtering) for example, to allow each material to deposit in each of the grooves 12 at a different rate and to allow thermally highly conductive materials to deposit at a different ratio in each of the grooves 12. If all of the thermally conductive linear regions 3 are divided into a plurality of groups each consisting of a plurality of mutually adjacent thermally conductive linear regions 3, and a higher thermal conductivity is given to each thermally conductive linear region 3 in a group which is radially more inward than another, the sputtering process is performed by utilizing a single target for each group of grooves 12 for example, to allow the thermally highly conductive material to deposit in the grooves 12, so that each group has a deposit of a thermally highly conductive material of a different ratio from the others.

Next, a film of a predetermined material is formed on the recording layer 1 and thermally conductive linear regions 3 by sputtering method for example, thereby forming a protective layer 2 as shown in FIG. 6(d). Thus, the first variation of the magnetic disc X can be manufactured through the steps described above.

Figure 7:
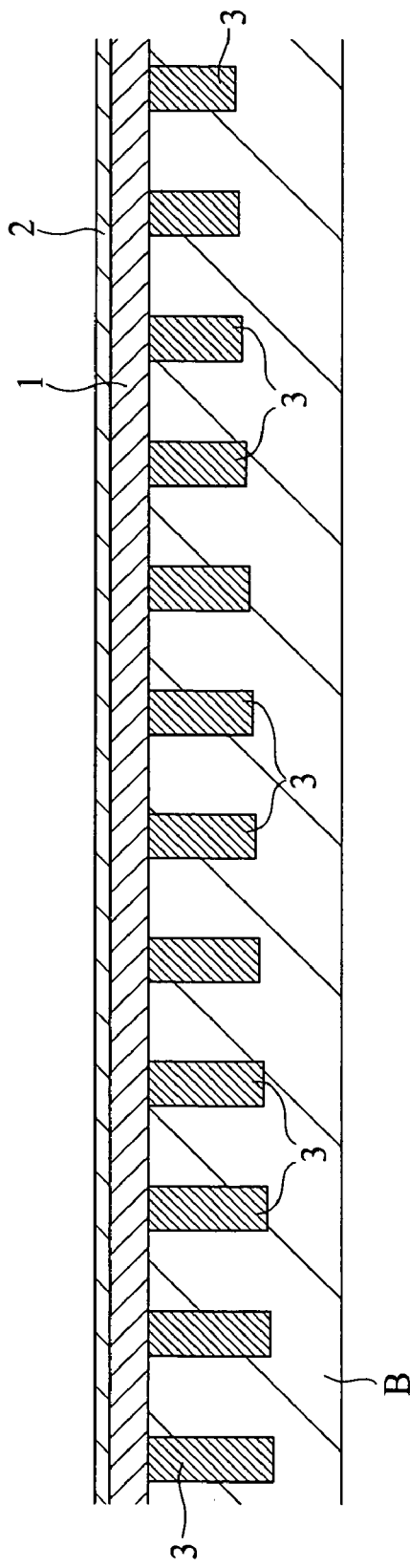
FIG. 7 is a partial sectional view of a second variation of the magnetic disc in FIG. 1, taken in a radius of the disc.

FIG. 7 is a partial sectional view of a second variation of the magnetic disc X, taken in a radius of the disc. In FIG. 7, the left-hand side is the side closer to the center of rotation A (radially inward side) shown in FIG. 2. In the present variation, a radially more inward thermally conductive linear region 3 is deeper in the substrate's thickness direction. The present variation can be manufactured in the same steps as for the magnetic disc X shown in FIG. 1, except that in the step described earlier with reference to FIG. 3(a), a radially more inward groove 11 is formed deeper than radially more outward ones, and that in the step described earlier with reference to FIG. 3(b), a radially more inward groove 11 is allowed to receive a greater amount of thermally highly conductive material than radially more outward ones.

In the present variation, a radially more inward thermally conductive linear region 3 exhibits a higher heat diverting capability when recording information since the radially more inward thermally conductive linear region 3 is deeper in the substrate thickness direction, being more capable of diffusing heat down as in the figure and away from the recording layer 1.

Figure 8:
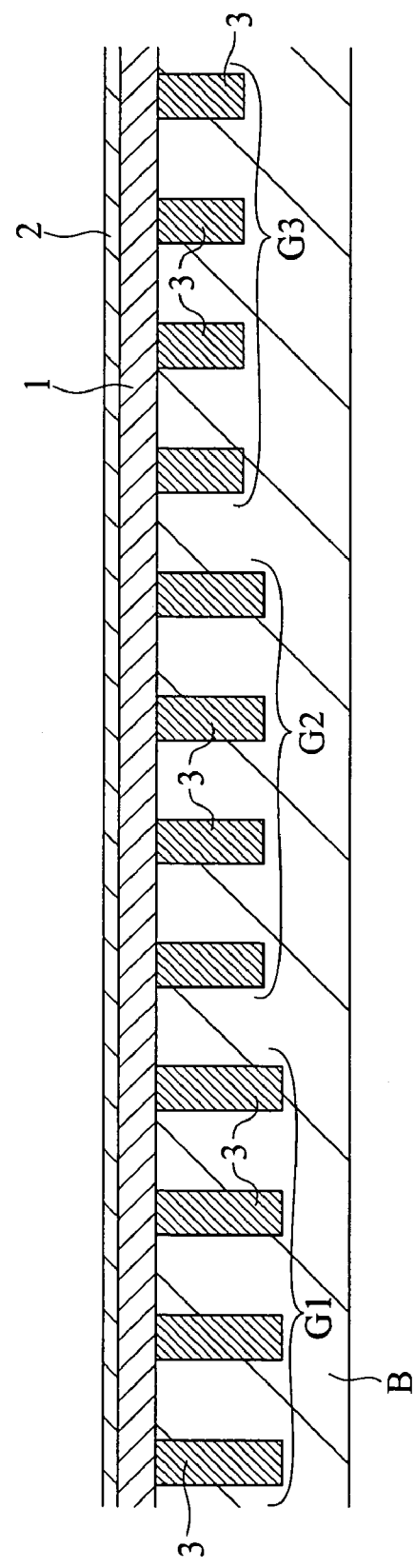
FIG. 8 is a partial sectional view of a third variation of the magnetic disc in FIG. 1, taken in a radius of the disc.

FIG. 8 is a partial sectional view of a third variation of the magnetic disc X, taken in a radius of the disc. In FIG. 7, the left-hand side is the side closer to the center of rotation A (radially inward side) shown in FIG. 2. In the present variation, all thermally conductive linear regions 3 are divided into a plurality of groups each consisting of a plurality of mutually adjacent thermally conductive linear regions 3. FIG. 8 shows groups G1, G2 and G3. Thermally conductive regions 3 which belong to a radially more inward group are deeper in the substrate thickness direction. The present variation can be manufactured in the same way as for the magnetic disc X shown in FIG. 1, except that in the step described earlier with reference to FIG. 3(a), grooves 11 belonging to a radially more inward group are formed deeper than those belonging to radially more outward groups, and that in the step described earlier with reference to FIG. 3(b), grooves belonging to a radially more inward group are allowed to receive a greater amount of thermally highly conductive material than those belonging to radially more outward groups.

In the present variation, the thermally conductive linear regions 3 belonging to a radially more inward group exhibit a higher heat diverting capability when recording information since those thermally conductive linear regions 3 belonging to a radially more inward group are deeper in the substrate thickness direction, being more capable of diffusing heat down as in the figure and away from the recording layer 1.

Figure 9:
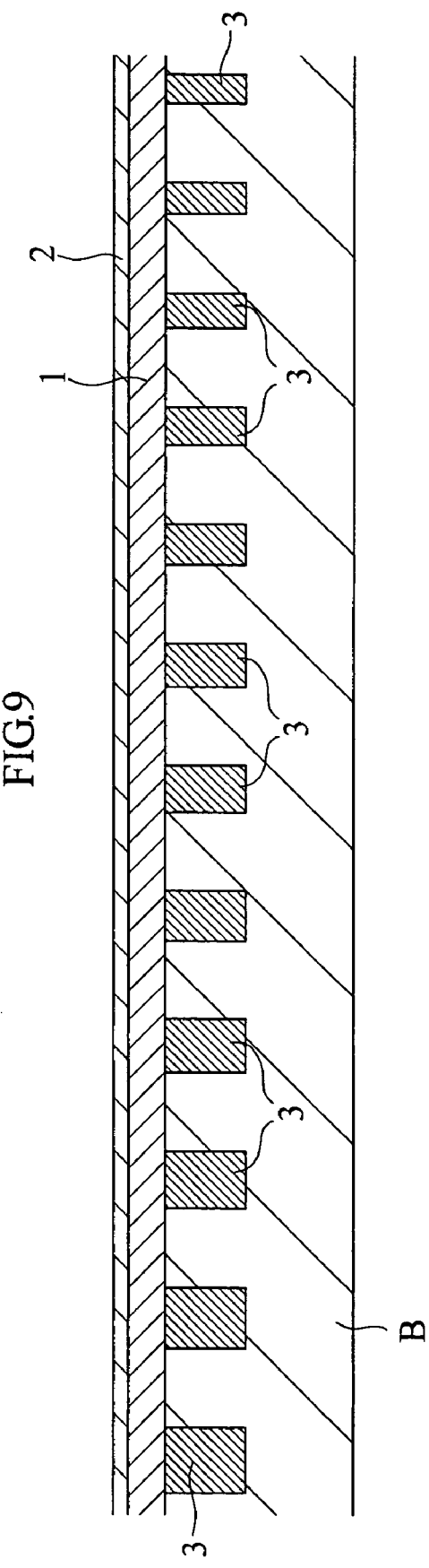
FIG. 9 is a partial sectional view of a fourth variation of the magnetic disc in FIG. 1, taken in a radius of the disc.

FIG. 9 is a partial sectional view of a fourth variation of the magnetic disc X, taken in a radius of the disc. In FIG. 9, the left-hand side is the side closer to the center of rotation A (radially inward side) shown in FIG. 2. In the present variation, a thermally conductive linear region 3 which is radially more inward is wider. The present variation can be manufactured in the same way as for the magnetic disc X shown in FIG. 1, except that in the step described earlier with reference to FIG. 3(a), a groove 11 which is radially more inward is formed wider than radially more outward ones.

In the present variation, a thermally conductive linear region 3 which is radially more inward exhibits a higher heat diverting capability when recording information since the radially more inward thermally conductive linear region 3 has a greater area of contact with the recording layer 1, being more capable of diffusing heat from the recording layer 1.

Figure 10:
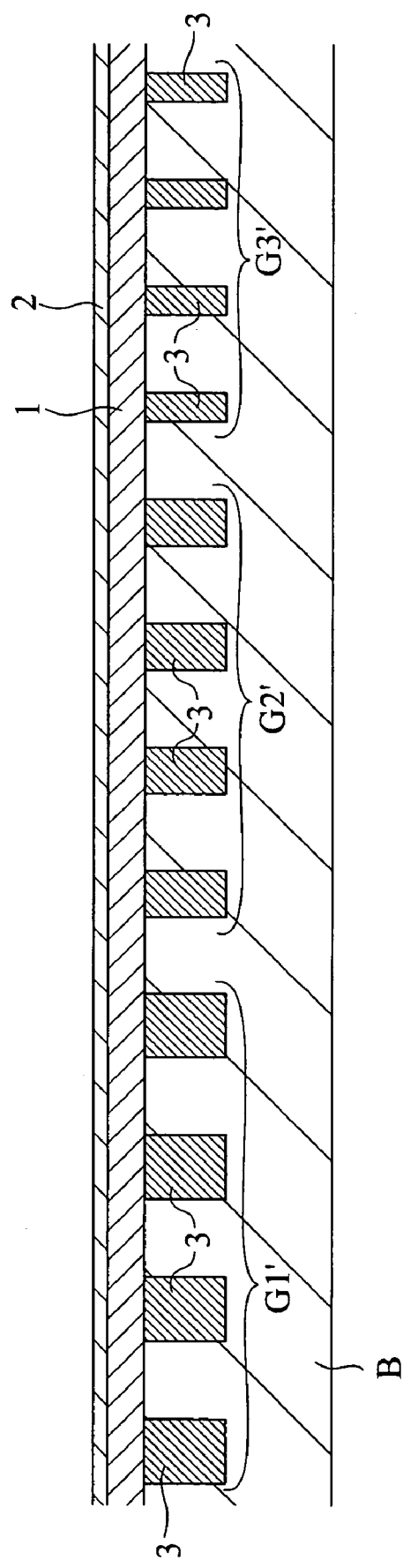
FIG. 10 is a partial sectional view of a fifth variation of the magnetic disc in FIG. 1, taken in a radius of the disc.

FIG. 10 is a partial sectional view of a fifth variation of the magnetic disc X, taken in a radius of the disc. In FIG. 10, the left-hand side is the side closer to the center of rotation A (radially inward side) shown in FIG. 2. In the present variation, all thermally conductive linear regions 3 are divided into a plurality of groups each consisting of a plurality of mutually adjacent thermally conductive linear regions 3. FIG. 8 shows groups G1', G2' and G3'. Thermally conductive regions 3 which belong to a radially more inward group are wider. The present variation can be manufactured in the same way as for the magnetic disc X shown in FIG. 1, except e.g. that in the step described earlier with reference to FIG. 3(a) as a step of forming grooves 11 which correspond to a plurality of thermally conductive linear regions 3, grooves 11 belonging to a radially more inward group are formed wider than those belonging to radially more outward groups.

In the present variation, thermally conductive linear regions 3 which belong to a radially more inward group exhibit a higher heat diverting capability when recording information since thermally conductive linear regions 3 which belong to a radially more inward group have a greater area of contact with the recording layer 1, being more capable of diffusing heat from the recording layer 1.

The invention claimed is:

1. A thermally assisted magnetic recording medium to be rotated in recording information, comprising:
    a substrate including a first surface and a second surface opposite to the first surface;
    a recording layer formed on the first surface of the substrate, the recording layer including a plurality of recording tracks extending in parallel about a center of rotation of the recording medium; and
    a plurality of thermally conductive regions provided at the first surface of the substrate and extending in parallel about the enter of rotation of the recording medium, the plurality of thermally conductive regions being arranged alternately with the plurality of recording tracks, respectively;
    wherein the thermally conductive regions have a higher thermal conductivity than the substrate, each of the regions being at least partially embedded in the substrate.

2. The thermally assisted magnetic recording medium according to claim 1, wherein each of the thermally conductive regions penetrates through the recording layer.

3. The thermally assisted magnetic recording medium according to claim 1, wherein at least one first thermally conductive region of the thermally conductive regions located closer to the center of rotation has a higher thermal conductivity than at least one second thermally conductive region of the thermally conductive regions that is located farther from the center of rotation.

4. The thermally assisted magnetic recording medium according to claim 1, wherein at least one first thermally conductive region of the thermally conductive regions located closer to the center of rotation and has a greater cross-sectional area than at least one second thermally conductive region of the thermally conductive regions that is located farther from the center of rotation.

5. The thermally assisted magnetic recording medium according to claim 4, wherein the at least one first thermally conductive region is longer in a substrate thickness direction than the at least one second thermally conductive region.

6. The thermally assisted magnetic recording medium according to claim 4, wherein the at least one first thermally conductive has a same length in a substrate thickness direction as the at least one second thermally conductive region, but is wider than the at least one second thermally conductive region.

7. The thermally assisted magnetic recording medium according to claim 1, wherein the plurality of thermally conductive regions are divided into groups, each group including adjacent thermally conductive regions, and wherein a first thermally conductive region belonging to a group located closer to the center of rotation and has a higher thermal conductivity than a second thermally conductive region belonging to the group.

8. The thermally assisted magnetic recording medium according to claim 1, wherein the plurality of thermally conductive regions are divided into groups, each group including adjacent thermally conductive regions, and wherein a first thermally conductive region belonging to a group located closer to the center of rotation has a greater cross-sectional area than a second thermally conductive region belonging to the group.

9. The thermally assisted magnetic recording medium according to claim 8, wherein the first thermally conductive region is longer in a substrate thickness direction than the second thermally conductive region.

10. The thermally assisted magnetic recording medium according to claim 8, wherein the first thermally conductive region is wider than the second thermally conductive region.

11. A thermally assisted magnetic recording medium to be rotated in recording information, comprising:
substrate including a first surface and a second surface opposite to the first surface;
a recording layer formed on the first surface of the substrate; and
a plurality of thermally conductive regions provided at the first surface of the substrate and extending in parallel about a center of the rotation of the recording medium;
wherein the thermally conductive regions have a higher thermal conductivity than the substrate, each of the regions being at least partially embedded in the substrate; and
wherein each of the thermally conductive regions penetrates through the recording layer.

12. A thermally assisted magnetic recording medium to be rotated in recording information, comprising:
a substrate including a first surface and a second surface opposite to the first surface;
a recording layer formed on the first surface of the substrate; and
a plurality of thermally conductive regions provided at the first surface of the substrate and extending in parallel about a center of the rotation of the recording medium;
wherein the thermally conductive regions have a higher thermal conductivity than the substrate, each of the regions being at least partially embedded in the substrate; and
wherein the thermally conductive regions have a higher thermal conductivity the closer the same are located to the center of the rotation.

13. A thermally assisted magnetic recording medium to be rotated in recording information, comprising:
a substrate including a first surface and a second surface opposite to the first surface;
a recording layer formed on the first surface of the substrate; and
a plurality of thermally conductive regions provided at the first surface of the substrate and extending in parallel about a center of the rotation of the recording medium;
wherein the thermally conductive regions have a higher thermal conductivity than the substrate, each of the regions being at least partially embedded in the substrate; and
wherein the thermally conductive regions have a greater cross-sectional area the closer the same are located to the center of the rotation.

14. A thermally assisted magnetic recording medium to be rotated in recording information, comprising:
a substrate including a first surface and a second surface opposite to the first surface;
a recording layer formed on the first surface of the substrate; and
a plurality of thermally conductive regions provided at the first surface of the substrate and extending in parallel about a center of the rotation of the recording medium;
wherein the thermally conductive regions have a higher thermal conductivity than the substrate, each of the regions being at least partially embedded in the substrate; and
wherein the plurality of thermally conductive regions are divided into groups, each group including adjacent ones of the thermally conductive regions, and wherein a thermally conductive region belonging to a group relatively closer to the center of the rotation has a higher thermal conductivity than another thermally conductive region belonging to a group located relatively more distantly from the center of the rotation.

15. A thermally assisted magnetic recording medium to be rotated in recording information, comprising:
a substrate including a first surface and a second surface opposite to the first surface;
a recording layer formed on the first surface of the substrate; and
a plurality of thermally conductive regions provided at the first surface of the substrate and extending in parallel about a center of the rotation of the recording medium;
wherein the thermally conductive regions have a higher thermal conductivity than the substrate, each of the regions being at least partially embedded in the substrate; and
wherein the plurality of thermally conductive regions are divided into groups, each group including adjacent ones of the thermally conductive regions, and wherein a first thermally conductive region belonging to a group located relatively closer to the center of the rotation has a greater cross-sectional area than a second thermally conductive region belonging to a group located relatively more distantly from the center of the rotation.

* * * * *